March 3, 1964 TSUTOMU TAKAO 3,123,412
PLATED WEARING MEMBER
Filed Sept. 26, 1961 6 Sheets-Sheet 1

INVENTOR.
TSUTOMU TAKAO

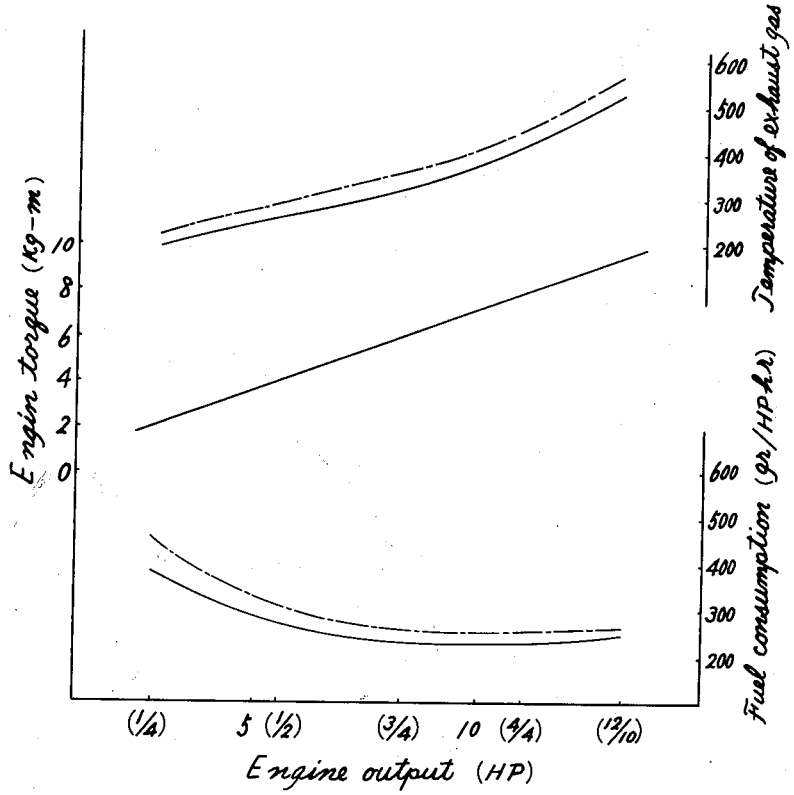

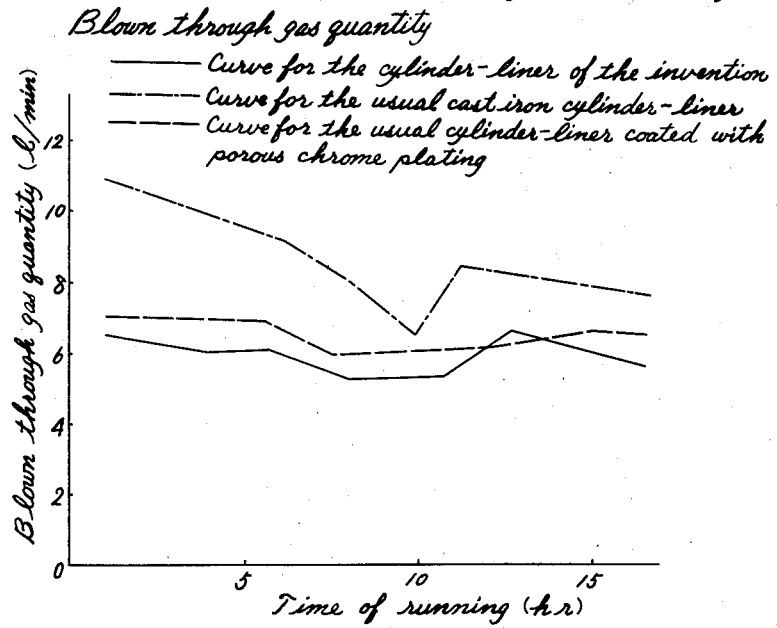

Fig. 3 Gasoline engine with 4 cylinders in series
Engine revolution 4,000 r.p.m
Load on dynamometer 6.70kg Blown through gas quantity
— Curve for the cylinder-liner of the invention
—·— Curve for the usual cast iron cylinder-liner
— — Curve for the usual cylinder-liner coated with porous chrome plating

Fig. 7

Comparison of physical properties between various aluminum alloys and cast iron

|  | Specific gravity | Tensile strength Kg/mm² | Heat conductivity Kcal/mh°C | Heat expansion ratio ×10⁻⁶ | Hardness HB |
|---|---|---|---|---|---|
| Silmin (AC3A) | 2.65 | 22–26 | 0.33 | 22 | 55–60 |
| Y-alloy (AC5A) | 2.80 | 23–27 | 0.36 | 24.6 | 70–100 |
| Lo-EX (AC8A) | 2.68 | 27–30 | 0.33 | 22 | 95–126 |
| Alsil | 2.60 | 15–20 | 0.28 | 18–19 | 90–120 |
| Cast iron for Cylinder | 7.30 | 25 | 0.14 | 12 | 210–240 |

INVENTOR.
TSUTOMO TAKAO
BY M. Glew and Toren
ATTORNEYS

March 3, 1964

TSUTOMU TAKAO 3,123,412

PLATED WEARING MEMBER

Filed Sept. 26, 1961

The highest temperature of the piston

Numerals are for the cylinder-liner of the invention.
(Numerals) are for the usual cast iron cylinder-liner.

INVENTOR.
TSUTOMO TAKAO
BY
McGlew and Toren
ATTORNEYS

United States Patent Office

3,123,412
Patented Mar. 3, 1964

3,123,412
PLATED WEARING MEMBER
Tsutomu Takao, Kawaguchi City, Japan, assignor to Nippon Piston Ring Kabushiki Kaisha, Tokyo, Japan
Filed Sept. 26, 1961, Ser. No. 140,933
Claims priority, application Japan Dec. 29, 1960
5 Claims. (Cl. 308—4)

This invention relates to a cylinder and cylinder-liner for water cooled internal combustion engines.

More specifically, the invention is directed to a novel cylinder or liner construction for water cooled internal combustion engines which improves the performance characteristics of the engine by reducing fuel consumption and engine weight and by prolonging the life of the engine.

In recent times, ever increasing demands are being made on internal combustion engines with regard to speed and output and various attempts have been made to improve the performance characteristics and thus enhance the marketability of water cooled internal combustion engines. Thus, for example, it has been suggested to increase the intake air pressure by means of turbo-chargers. Further, the fuel quality has been improved. It is, however, well recognized that the results have not been fully satisfactory.

From the viewpoint of actual users of internal combustion engines, the most important aspect is, of course, reduced fuel consumption and more particularly to effect such reduced consumption without reducing the engine output.

However, there has been found no sufficient means to solve this problem.

The main object of the invention is to eliminate the above mentioned disadvantages. Another object is to provide an internal combustion engine which may be simply and cheaply manufactured, in consideration of the above circumstances.

Briefly, the invention is characterized in that aluminum alloy cylinders or cylinder liners are used, which are plated with a micro-porous hard chrome layer having a special pore structure of about 0.001–0.01 mm. porous width and about 0.001–0.03 mm. porous depth (hereinafter simply called a chrome plating having special porous structure). The layer is coated directly on the inside face of the cylinder or liner of aluminum alloy.

The invention will be more fully explained by way of comparative data and tables as shown in the accompanying drawings, in which FIG. 1 illustrates by way of comparison the performance curve of prior art gasoline engines having four cylinders or cylinder liners of cast iron plated with a prior art porous chromium layer and of a corresponding gasoline engine in which the cylinders are of aluminum and plated with a chromium layer in accordance with this invention;

FIG. 2 illustrates comparison performance tests corresponding to FIG. 1 but applied to a one cylinder diesel engine;

FIG. 3, by way of comparison, indicates the air intake volume of a prior art four cylinder gasoline engine in which the cylinder is of cast iron and is plated with a conventional porous chromium coat and of a corresponding engine wherein the cylinder is plated in accordance with this invention and is made of aluminum alloy;

Figure 8A:
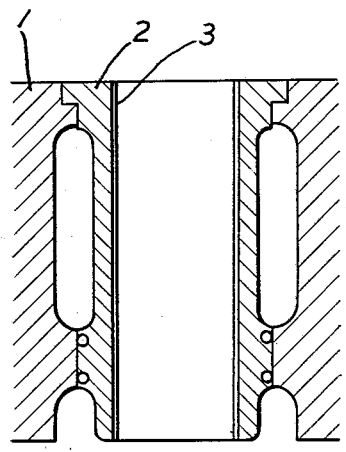
Figure 8B:
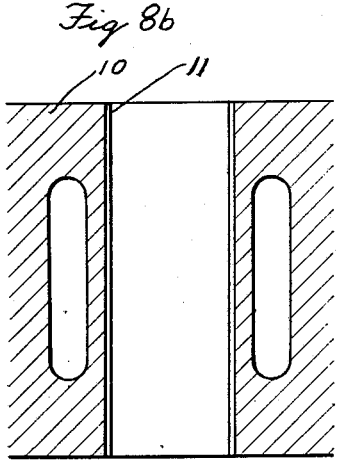
Figure 9:
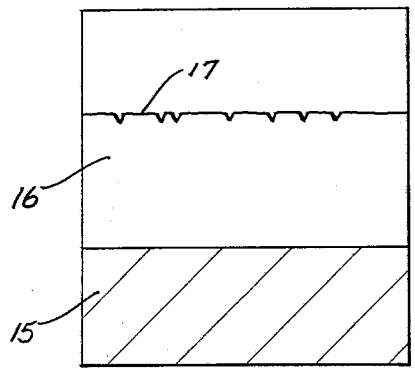

FIG. 7 indicates various physical properties of different kinds of aluminum alloys and cast iron, respectively;

FIG. 8a is a sectional view through a cylinder liner;

FIG. 8b shows an interiorly plated cylinder of aluminum alloy;

FIG. 9 shows on enlarged scale a plated cylinder body; and

Figure 10:
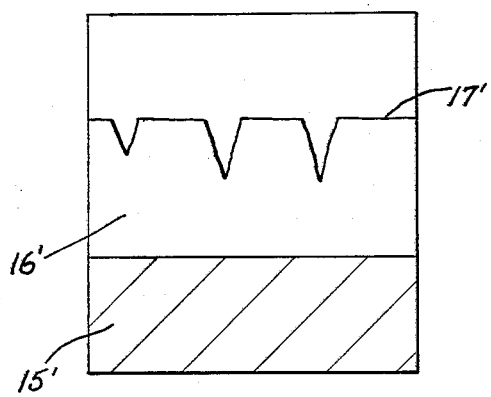

FIG. 10 is a view similar to FIG. 9.

Figure 6:
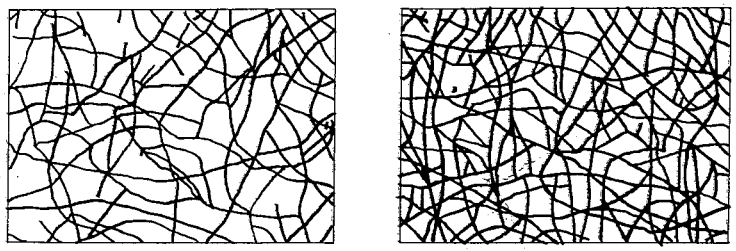
FIG. 6 shows in magnification the micro-porous chrome plating surface structure according to the present invention.

As previously stated, and as shown in detail in FIG. 6, the width and the depth of the porous structure of the porous chromium plate surface are, in accordance with this invention, of micro dimensions so that the entire structure is finely porous and its mesh numbers are increased without substantially changing the depth and width of the porous structure.

Figure 5:
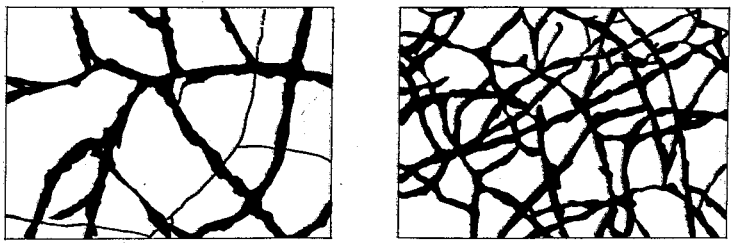
FIG. 5 shows in magnification the conventional porous chrome plate surface structure on a cast iron cylinder liner.

As shown in FIG. 5, in the conventional type porous chromium plate structure, the width of the pores is generally 0.01 to 0.05 mm., while the depth, assuming that the thickness of the plating is about 0.1 to 0.15 mm., is about 0.03 to 0.05 mm. This means that in the conventional type porous chrome plate structure a relatively rough surface structure is provided.

By contrast, due to the fineness of the porous structure in accordance with the present invention, as seen in FIG. 6, a different surface structure is obtained which is very effective for increasing the engine performance. Owing to the smallness of the individual pores, the frictional forces exerted by the moving piston smooth out the pores during the initial running-in period so that the pores disappear after some time and the chromium layer then presents a mirror-smooth surface.

FIG. 8a is a sectional view through a cylinder liner 2 having a micro-porous chromium plated wearing surface 3. The cylinder liner 2 is secured to the cylinder block 1 within the space defined by the cylinder block. The liner 2 is made from an aluminum alloy. FIG. 8b shows a cylinder 10 of aluminum alloy which is interiorly plated with a porous chromium layer 11 in accordance with this invention.

FIG. 9 shows on an enlarged scale a cylinder or liner body 15 plated with a chromium layer 16 in accordance with this invention. It will be noted that the wearing surface 17 of the layer 15 is relatively smooth and even, while the corresponding layer 17′ in FIG. 10, which illustrates a conventional porous chrome layer, is rough and uneven with deep crevices. FIG. 10 is otherwise similar to FIG. 9, illustrating the liner cylinder body 15′, while the chromium layer is indicated by reference numeral 16′.

The aluminum alloys to be used in the invention are aluminum alloys for casting, based on aluminum, with which small or very small amount of Cu, Si, Mg, Zn, Fe, Mn, Ti or Ni, Cr etc. are blended, and the micro-porous hard chrome plating to be used is a hard chrome having a hardness HMV (Vickers hardness) of more than 750, particularly having said special structure, as shown in FIG. 6 for example, wherein the porous breadth as well as the porous depth being very small as in about micro-order and mesh numbers thereof may be increased without practically changing the depth thereof, and usually thickness of plating will be made about 0.03–0.1 mm. This structure is remarkably different from that of usually used porous chrome plating as shown in FIG. 5 for example.

The special porous structure has such a special performance, according to experimental results, as will be described under and shown in FIG. 1 to FIG. 4 inclusive, that in the first stage of fit running of the engine, not only the fitting is smooth and speedy, but also the structure will disappear to become a solid mirror plane having very little sliding friction, when the running becomes regular. And, as is generally known, aluminum alloy has special properties that its weight is very light and its heat conductivity is about 2.5 times larger than that of cast iron as seen from FIG. 7.

In the invention, the performance of said special structure of micro-porous chrome plating is noticed and utilized in combination with peculiar properties of aluminium alloy. As is generally known, cast iron is used mostly as cylinder nor cylinder liner or the cast iron is made as mother material, on which inside face is coated with usual porous chrome plating to be used as a cylinder or cylinder liner. However, this usual porous structure is a coarse one having porous breadth of about 0.01–0.05 mm. and porous depth of about 0.03–0.05 mm. at plating layer of about 0.1–0.15 mm., and is remarkably different in the form of structure from the micro-porous used in this invention, and the effect of this usual porous structure when its is coated on inside face of the cylinder or cylinder-liner or -sleeve is entirely different from that of this invention and in the first stage of fit running of the engine, it has no influence on the fitting and after the running becomes regular, the original structure is still maintained fully, having no effect to decrease the friction of piston. This fact is clearly proved by the result of comparative experiments which will be described as under.

As mentioned above, when the cylinder and cylinder-liner or -sleeve according to this invention is used for an internal combustion engine, smooth and prompt fitting will be obtained by the peculiar properties of micro-porous chrome plating of the special structure of this invention during first running stage of the engine, and when the running becomes regular, said special porous structure will completely disappear to become a mirror plane of hard chrome plating, on which the piston ring will slide in best condition, thus the wearing by sliding will be made minimum. Further, in this invention, because of the use of aluminum alloy having large heat conductivity for the mother material of cylinder and cylinder-liner or -sleeve, not only interior temperature of the combustion chamber will be suitably decreased, but also its temperature distribution will be made uniform, resulting in increase of suction efficiency as well as increase of combustion efficiency, thus largely effecting on the decrease of fuel consumption which being keenly desired by the user. Also, owing to the fact that the sliding face is smooth and the fitting is excellent, there are such advantages that amount of blown through gas is considerably decreased, resistance against sliding friction is decreased, thus engine loss will be reduced. And, it is a matter of course that the fact of using aluminum alloy as the mother material for cylinder and cylinder-liner or -sleeve in this invention will bring large advantage on the reduction of engine weight.

There is a problem in the use of aluminum alloy as the mother material whether the cylinder will be deformed or not, because the aluminum alloy is considerably inferior to the cast iron in its mechanical strength etc., however, such a deformation will be related to the time of fitting in the first stage of running and blowing through of gas etc., and when the fitting running is smooth and the fitting time is short as well as no gas is blown through, there is no trouble in the regular running, which is proved by the result of actual experiments.

Some examples of experiment for this invention will be described as follows.

Figure 1:
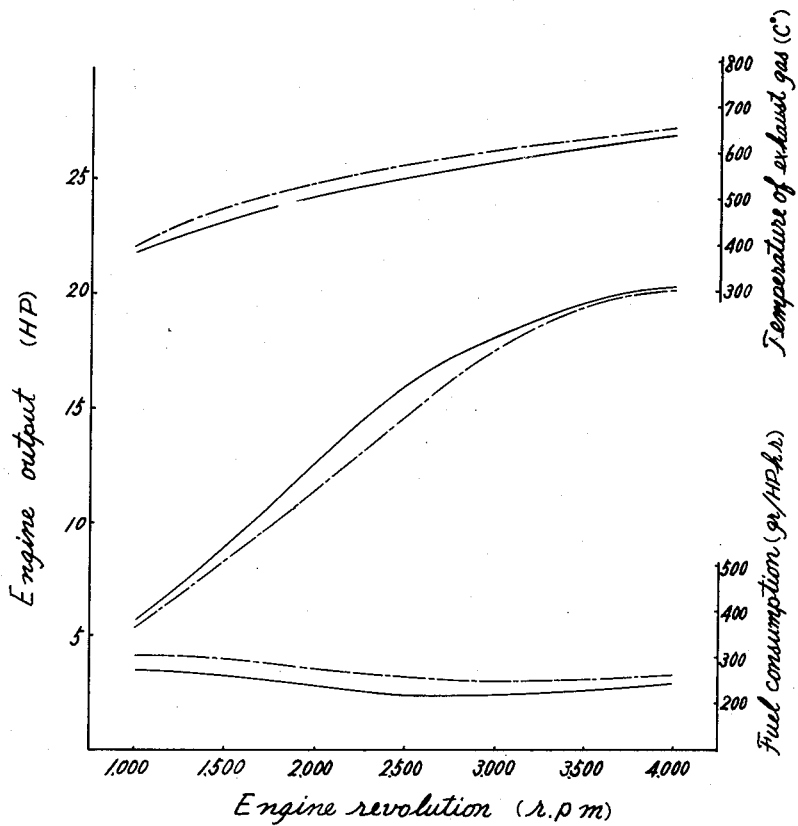

In a gasoline engine for automobile having 4 cylinders in series (bore×stroke : 54.8×80 max. H.P. : 21 H.P./ 4000 r.p.m.) and a diesel engine of vertical type having single cylinder (bore×stroke : 120×170, max. H.P. : 11 H.P./1000 r.p.m.), the comparative experiments have been made about the performances after 20 hours running between the cylinder liner according to this invention and the usual cylinder liner of cast iron or of cast iron mother material coated with usual porous structure chrome plating, and resulted performance curves are shown in FIG. 1 for the former and in FIG. 2 for the latter. Namely, in both diagrams, there are shown the reductions of about 6% in the temperature of exhaust gas and of about 10% in the fuel consumption.

Comparative experimental curves for blown through gas quantity are shown in FIG. 3, wherein gas quantity of this invention is smaller than any case for usual cylinder liner.

Figure 4:
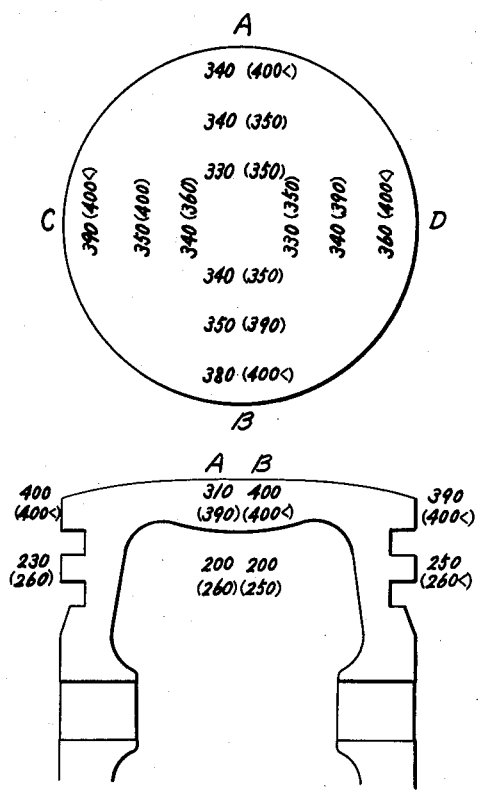
FIG. 4 shows the highest temperature at various locations of a piston.

The highest temperatures on various portions of the top of piston after the fitting running are experimentally compared as shown in FIG. 4 (numerals in parenthesis show the temperature of usual piston made of cast iron). On the contrary, on the piston according to this invention, temperature distribution is uniform on every portion, and shows temperature drop of 20° C. to 60° C. in average than usual piston of cast iron mother material.

In the test of resistance against friction, those coated with usual porous chrome plating as shown in FIG. 5 show about 1.5 times larger coefficient of friction than the embodiment of this invention.

In short, the cylinder and cylinder-liner according to this invention may be said to be excellent embodiments which are advantageous to these lines of industrial world, because the saving of fuel consumption of an internal combustion engine, the reduction of engine weight, the improvement of engine output and the prolongation of engine life may be all together effected by them very simply and cheaply.

A method of obtaining porosity of micro-dimensions in accordance with this invention is disclosed in the Japanese periodical "Jidosha Gizutsu" (Automobile Maunfacture), vol. 15, No. 5, pages 210–214 and vol. 15, No. 8, pages 348–350.

What is claimed is:

1. In a cylinder-piston arrangement for a water cooled internal combustion engine, wherein the piston reciprocates relative to and along the interior cylinder surface, the improvement which comprises that said surface is plated with a porous chromium layer, the pores of the layer having a width of about 0.001 to 0.01 mm. and a depth of about 0.001 to 0.03 mm.

2. The improvement of claim 1, wherein the cylinder is of aluminum.

3. A cylinder for water cooled internal combustion engines which comprises a cylinder body made from aluminum alloy, said cylinder body having an internal surface layer directly plated onto said body, said layer consisting of chromium and having a micro-porous consistency with a pore width of about 0.001 to 0.01 mm. and a pore depth of about 0.001 to 0.03 mm.

4. A cylinder liner for water cooled internal combustion engines, which comprises a liner body made from an aluminum alloy, said liner body being plated with a chromium layer of porous nature, the pores of said layer having a width of about 0.001 to 0.01 mm. and having a depth of about 0.001 to 0.03 mm.

5. A wearing member of aluminum alloy having a wearing surface consisting of chromium plated onto said aluminum member, said chromium surface having a plurality of substantially uniformly distributed pores of a depth of about 0.001 to 0.03 mm. and a width of about 0.001 to 0.01 mm.

References Cited in the file of this patent
UNITED STATES PATENTS

| | | |
|---|---|---|
| 2,314,604 | Van der Horst | Mar. 23, 1943 |
| 2,412,698 | Van der Horst | Dec. 17, 1946 |
| 2,809,873 | Cavileer | Oct. 15, 1957 |
| 2,833,264 | Dailey et al. | May 6, 1958 |